US006795146B2

United States Patent
Dozov et al.

(10) Patent No.: US 6,795,146 B2
(45) Date of Patent: Sep. 21, 2004

(54) BISTABLE DEVICE FOR REFLECTION DISPLAY WITH INVERSE CONTRAST

(75) Inventors: Ivan N. Dozov, Gif-sur-Yvette (FR); Philippe R. Martinot-Lagarde, Marcoussis (FR); Daniel N. Stoenescu, Orsay (FR)

(73) Assignee: NEMOPTIC, Magne-les-Hame (FR)

( * ) Notice: Subject to any disclaimer, the term of this patent is extended or adjusted under 35 U.S.C. 154(b) by 0 days.

(21) Appl. No.: 10/275,930

(22) PCT Filed: May 11, 2001

(86) PCT No.: PCT/FR01/01427

§ 371 (c)(1),
(2), (4) Date: Nov. 8, 2002

(87) PCT Pub. No.: WO01/86345

PCT Pub. Date: Nov. 15, 2001

(65) Prior Publication Data

US 2003/0128314 A1 Jul. 10, 2003

(30) Foreign Application Priority Data

May 12, 2000 (FR) .............................................. 00 06105

(51) Int. Cl.[7] ........................ G02F 1/1335; G02F 1/133; C09K 19/52
(52) U.S. Cl. ........................... 349/113; 349/33; 349/96; 349/117; 349/123; 349/177
(58) Field of Search ............................... 349/33, 96, 99, 349/112, 113, 117, 120, 177

(56) References Cited

U.S. PATENT DOCUMENTS

| | | | | |
|---|---|---|---|---|
| 4,333,708 A | * | 6/1982 | Boyd et al. | 349/129 |
| 5,357,358 A | * | 10/1994 | Durand et al. | 349/125 |
| 5,796,459 A | * | 8/1998 | Bryan-Brown et al. | 349/132 |
| 5,995,173 A | * | 11/1999 | Barberi et al. | 349/33 |
| 6,327,017 B2 | * | 12/2001 | Barberi et al. | 349/177 |
| 6,469,768 B1 | * | 10/2002 | Lee | 349/177 |

OTHER PUBLICATIONS

Jpn. J. Appl. Phys. vol. 37, No. 5A, May 1998, "Reflective Bistable Twisted Nematic Liquid Crystal Display", Z. Xie, et al., pg 2572–2575.*

* cited by examiner

Primary Examiner—Tarifur R. Chowdhury
(74) Attorney, Agent, or Firm—Blakely, Sokoloff, Taylor & Zafman

(57) ABSTRACT

The invention concerns a bistable device comprising a liquid crystal material, aligning means, which orient the liquid crystal to provide two stable or metastable textures, means for applying electric signals enabling to switch between the two textures, a polarizer (10) associated with the front surface of the device, placed inside or outside same, a reflective, specular or diffusing element, placed on the rear surface of the liquid crystal, inside or outside the device, allowing light to pass through the device twice and to return towards the observer or towards additional optical elements, and a compensator (20), placed between the polarizer and the reflective element, with an optical retardation $d_c \Delta n_c$ close to $\lambda_0/4$.

22 Claims, 14 Drawing Sheets

BISTABLE DEVICE FOR REFLECTION DISPLAY WITH INVERSE CONTRAST

The present patent application is a non-provisional application of International Application No. PCT/FR01/01427, filed May 11, 2001.

The present invention relates to the field of liquid crystal display devices.

STATE OF THE ART

Liquid crystals are commonly used in display devices. In nematic displays, which constitute the preferred application of the present invention, a nematic liquid crystal is used which is achiral or chiralized, e.g. by adding a chiral dopant. The orientation and the anchoring of the liquid crystal close to the surfaces are defined by alignment layers or treatments applied to the substrates. In the absence of a field, this serves to impose a uniform or slightly twisted nematic texture.

Most devices that have been proposed and implemented in the past are monostable. In the absence of an electric field, the device implements only one texture. This texture corresponds to an absolute minimum for the total energy of the cell. Under a field, the texture is deformed continuously and its optical properties vary as a function of the applied voltage. When the field is interrupted, the nematic returns to its single monostable texture.

Another class of the nematic display is that of nematics that are bistable, multistable, or metastable. Under such circumstances, at least two distinct textures that are stable or metastable in the absence of a field can be implemented in the cell, using the same anchorings on the surfaces. The terms "bistable" or "metastable" are generally used to designate two states having the same energy or energies that are very close, and that are capable of lasting substantially indefinitely in the absence of an external command. In contrast, the term "metastable" is used for states having energy levels that are slightly different and that are liable to switch after a long relaxation time. Switching between the two states is implemented by applying suitable electrical signals. Once a state has been written, it remains stored in the absence of a field because of the bistable (or metastable) nature of the crystal. This memory of bistable displays is most attractive for numerous applications. Firstly it enables images to be refreshed at a slow rate which is very favorable for reducing energy consumption in portable appliances. Secondly, in fast applications (e.g. video) the memory makes a very high multiplexing rate possible, thus enabling video to be displayed in high resolution.

A typical example of a known bistable display [document 1] is shown diagrammatically in FIG. 1. In that case, one of the bistable textures ($T_0$) is uniform (or, generally, lightly twisted), whereas the other ($T_{360}$) presents an additional twist of ±360°. The spontaneous cholesteric pitch $p_0$ of the material is selected so that $p_0 \approx 2 \cdot d$ (where d is the thickness of the liquid crystal layer) so as to equalize the energies of the two topologically equivalent states $T_0$ and $T_{360}$. A third texture $T_{180}$, which is topologically different from the textures $T_0$ and $T_{360}$ is also possible using the same anchorings, and its energy is lower since it is better adapted to the spontaneous twisting of the material. However, in the absence of a field, $T_0$ and $T_{360}$ remain stable and do not transform into $T_{180}$ because of topological constraints. Under a strong electric field, a fourth texture is achieved that is almost homeotropic, with the molecules being perpendicular to the substrates almost throughout, except in the vicinity of the plates. It is this texture that makes it possible to switch between the metastable textures $T_0$ and $T_{360}$. The particular final texture is selected under hydrodynamic control launched at the end of the control signal (backflow effect).

Another example of a known bistable display [document 2] is shown diagrammatically in FIG. 2. The two bistable textures $T_0$ (uniform or lightly twisted) and $T_{180}$ which differ by twist of ±180° are topologically incompatible. The spontaneous pitch $p_0$ of the nematic is selected to be close to four times the thickness d of the cell, i.e. $p_0 \approx 4 \cdot d$ so as to make the energies of $T_0$ and $T_{180}$ substantially equal. Without a field there does not exist any other state of lower energy: $T_0$ and $T_{180}$ are genuinely bistable. Under a strong field, an almost homeotropic texture (H) is obtained, with at least one of the anchorings on the substrates being broken: the molecules are normal to the plate in the vicinity of this surface. At the end of the control pulse, the cell is guided towards one or other of the bistable states depending on whether coupling between the movement of the molecules close to the two surfaces is elastic or hydrodynamic: elastic coupling returns towards the $T_0$ state while hydrodynamic coupling returns towards the $T_{180}$ state.

In order to enable the information displayed on the device to appear, it is necessary for the textures it implements to have different optical properties. Most devices operate with polarized light and use additional optical elements: polarizers, filters, compensating plates, etc. These elements and their orientations relative to the anchorings on the two surfaces are selected as a function of the configuration of the display so as to optimize pertinent optical performance: contrast, brightness, color, viewing angle, etc.

For monostable displays, optimization must apply to an entire continuum of states implemented under fields of various strengths, because these states are displayed throughout the duration of an image. A very large number of optical geometries have been proposed and implemented for various devices, taking account of the particular features of each of said displays. For each display, the configurations of additional elements are also adapted depending on whether they are used in transmission or in reflection.

The optics of the two above-mentioned types of bistable display are very different from that of monostable devices. Firstly, throughout most of the time an image lasts, only two textures exist in the cells of the display: textures corresponding to the two bistable states. The optimum configuration must enable maximum contrast between these two states, while minimizing transient optical effects during switching, due to passing quickly through intermediate states under a field. Furthermore, the main difference between the two bistable textures, an additional twist of 180° or 360° is not a parameter that is available for optimization: it is imposed by the physical mechanism used for achieving two bistable states. In addition, bistable switching requires a strong electric field (close to 10 volts per micrometer (V/$\mu$m)). The liquid crystal layer must therefore be very fine (d$\approx$2 $\mu$m to 3 $\mu$m) in order to enable control to be performed using reasonable voltages so optical optimization must take these requirements into account.

Until now, bistable devices have been considered above all in transmission mode, which is the mode in which they were originally proposed.

However, bistable memory is very useful in reflection mode: a bistable display operating in reflection can retain and display an image for a very long time without consuming any energy, neither for its own operation (it is bistable), nor for lighting purposes (it does not require an internal light source).

Recently, certain particular reflective configurations have been proposed for bistable devices having a twist difference of 360° [documents 3, 4, and 5]. They use a single polarizer parallel to the nematic director on the front substrate. The state with little twist $T_0$ has twist of 63.6° [document 3] and of −36° [document 4]. The contrast specified in those two cases is less than 10 in white light.

The configurations that have been proposed in the past for reflective bistable displays operate in "normal" contrast, i.e. with a black state that is uniform or of small twist ($T_0$) and with a white state that is highly twisted ($T_{180}$ or $T_{360}$). That configuration which is relatively easy to implement can theoretically achieve contrast of about 60 in white light. Unfortunately it is very sensitive to variations in the thickness d and in the twist angle $\Delta\phi$ of the $T_0$ state, both of which are inevitable because of technological reasons.

BASIS OF THE INVENTION

The present invention now has the object of proposing a novel display device based on liquid crystals and which presents properties that are better than those of previously known devices.

In the context of the present invention, this object is achieved by a reflective bistable display device characterized by the fact that it comprises:

a) a liquid crystal material contained between two parallel substrates having electrodes on their facing inside surfaces to apply an electric field to said liquid crystal, at least the front substrate and the front electrode being optically transparent;

b) alignment layers or treatments on the electrodes to orient the liquid crystal and enable at least two alternate distinct stable or metastable textures to be implemented in the absence of a field, where one of the textures is either non-twisted, or else twisted at a total angle lying in the range −90° to +90°, and the other possible texture presents additional twist to left or to right through an angle that is essentially an integer multiple of 180°;

c) the thickness d of the liquid crystal layer being selected in such a manner that the product $d \cdot \Delta n$ is close to $\lambda_0/4$, where $\lambda_0$ is the center wavelength of the working spectrum band of the display and $\Delta n$ is the birefringence of the liquid crystal for said wavelength;

d) means designed to apply electrical signals to the liquid crystal enabling it to switch between said two distinct textures and to remain in one or other of them after the field has been removed;

e) a polarizer associated with the front face of the device, placed inside or outside the device;

f) a specular or diffusing reflective element placed at the rear face of the liquid crystal, inside or outside the device, enabling light to pass twice through the device and return towards an observer or towards additional optical elements; and g) a compensator placed between the polarizer and the reflective element, the compensator presenting an optical delay $d_c \cdot \Delta n_c$ that is close to $\lambda_0/4$.

The reflective bistable display thus proposed by the present invention offers numerous advantages.

It makes use of contrast that is "inverted" with a $T_0$ state that is white and a high-twist $T_{180}$ or $T_{360}$ state that is black. Using a single polarizer and a compensating plate introducing an optical delay close to $\lambda/4$, it makes it possible to achieve configurations providing contrast of 50 to 60 in white light. Without losing optical quality, optimization of the device also makes it possible to reduce cell thickness, thereby making switching faster and reducing the control voltages needed for switching. Because contrast is inverted, the optical quality of the device remains very good even when there are large variations in d and $\Delta\phi$.

According to other characteristics of the invention:

the liquid crystal material comprises a liquid crystal or a liquid crystal mixture in a nematic phase;

the liquid crystal material comprises a liquid crystal or a liquid crystal mixture in a cholesteric or nematic phase doped by a chiral substance to enable the energies of certain textures amongst textures that are stable or metastable to be brought close together or equalized;

the liquid crystal, the alignment layers, and the means for applying the field are selected to enable switching under a field to be performed by breaking anchoring or by propagating defects between two textures that are bistable or metastable in the absence of a field, with the difference between the total twist angles in said two textures being essentially close to 180°;

the liquid crystal, the alignment layers, and the means for applying the field are selected in such a manner as to enable switching under a field to be performed by breaking anchoring, by in-volume continuous distortion, or by propagating faults between two textures that are bistable or metastable in the absence of a field, and the difference in total twist angles with these two textures is essentially close to 360°;

the compensating plate is placed between the polarizer and the liquid crystal;

the compensating plate is placed between the liquid crystal and the reflective element;

the compensating plate introduces an optical delay $\Delta I$ lying in the range $0.15\lambda_0$ to $0.35\lambda_0$, where $\lambda_0$ is the center wavelength of the working spectrum band;

the compensating plate is oriented at an angle lying in the range 35° to 55° relative to the polarizer;

the compensating plate is oriented at an angle close to 45° relative to the polarizer;

the optical delay $d \cdot \Delta n$ of the liquid crystal layer lies in the range $0.15\lambda_0$ to $0.35\lambda_0$, and preferably in the range $0.20\lambda_0$ to $0.32\lambda_0$, where $\lambda_0$ is the center wavelength of the working spectrum band;

the polarizer is a linear or an elliptical polarizer;

at least one of the electrodes contains a plurality of different segments in order to enable a plurality of independent pixels to be implemented on the same substrates and in the same device;

that the independent pixels are provided with independent means for applying the field;

the independent pixels are organized in a multiplexed passive matrix;

the independent pixels are organized in a multiplexed active matrix;

the polarizer is oriented at an angle close to 45° relative to the director of the liquid crystal on the front face of the device;

the twist angle of the texture in the low twist state, the additional twist $\pm m\pi$ in the second bistable state (where m is an integer), the orientation of the polarizer relative to the alignment of the liquid crystal on the front face, the thickness of the liquid crystal material placed between the two substrates, and the birefringence of the liquid crystal are optimized in such a manner as to obtain optimum optical performance, in particular in terms of contrast, brightness, and color;

the optical axis of the compensating plate is oriented at substantially 45° relative to the polarizer;

the compensating plate introduces an optical delay lying in the range 100 nanometers (nm) to 180 nm;

the polarizer is combined with the compensating plate in the form of a single element to constitute an electrical polarizer; and the thickness of the liquid crystal material is less than 6 µm.

Other characteristics, objects, and advantages of the present invention appear on reading the following detailed description and from the accompanying drawings given as non-limiting examples, and in which:

FIG. 1, described above, is a diagram showing the three states that can be obtained in a display constituting a first embodiment of the state of the art;

FIG. 2, also described above, is a diagram showing the three states that can be obtained with a display constituting a second embodiment of the state of the art;

DESCRIPTIVE PORTION

As with other reflective displays, bistable devices can be made in numerous configurations, having one or two polarizers, one or more compensating plates, etc. In the present invention, the device has a single polarizer placed on the light path at the front face of the device. This configuration has the important advantage of maximizing brightness since it minimizes light loss due to a possible second polarizer.

Figure 3:
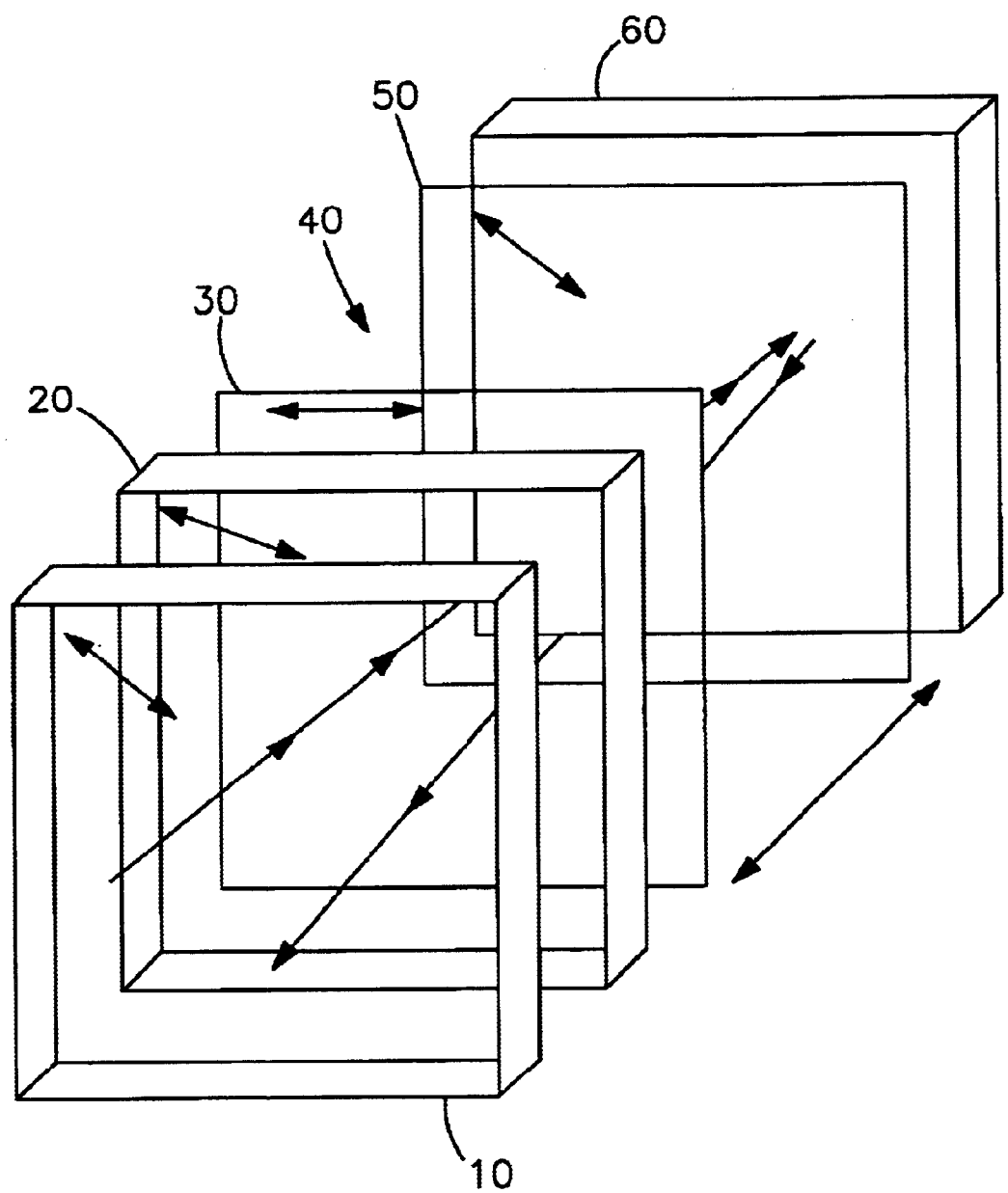
FIG. 3 is a diagrammatic perspective view of a cell in accordance with the present invention, showing the go-and-return path of light through the device.

As shown in FIG. 3, the device of the present invention comprises a liquid crystal layer 40, preferably a nematic liquid crystal, of thickness d placed between two substrates 30, 50, a polarizer 10 at the front face, a mirror 60 at the rear face of the liquid crystal 40, and a compensating plate 20.

The compensating plate 20 is placed between the polarizer 10 and the reflector 60. In the particular embodiment shown in FIG. 3, the compensating plate 20 is placed in front of the front substrate 30.

The optical axis of the compensating plate 20 is oriented at ≈45° relative to the polarizer 10. The optical path length difference introduced by the compensator 20 on a single pass of the light through it is $d_c \Delta n_c$ where $d_c$ is its thickness and $\Delta n_c$ is its birefringence (positive or negative). The corresponding angular phase shift is defined by $\delta = 2\pi d_c \Delta n_c / \lambda$ where $\lambda$ is the wavelength of the light.

Figure 4:
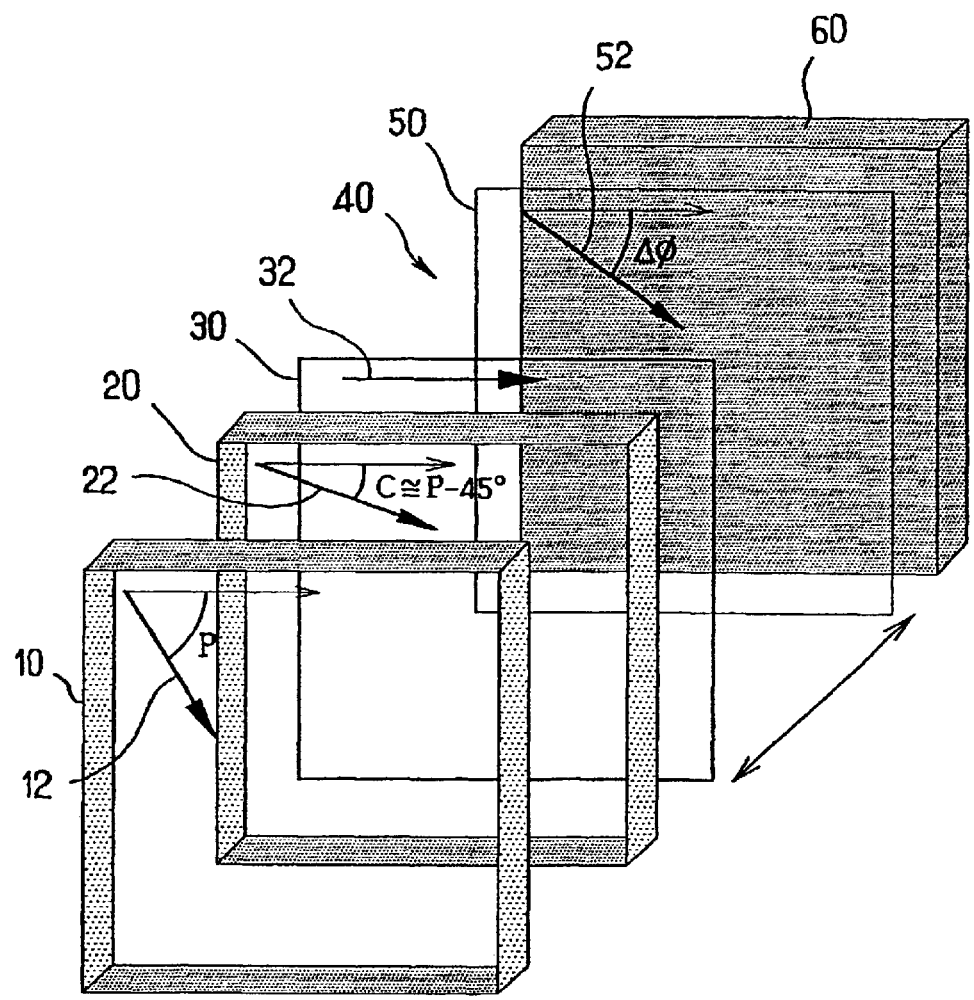
FIG. 4 is a similar view showing diagrammatically the orientations of the polarizer and of the compensating plate, together with the alignment directions on the substrates on either side of the liquid crystal.

In FIG. 4, the orientation of the polarizer 10 is referenced 12, the orientation of the compensating plate 20 is referenced 22, and the alignment directions defined respectively on each of the two substrates 30 and 50 are referenced 32 and 52.

In the context of the present invention, $\delta$ is selected to be approximately equal to 90° (i.e. $\pi/2$ radians), and for optimization purposes it is possible to vary all of the parameters which define the optical properties of the display: the twist angle $\Delta\phi_0$ of the texture in the low twist state ($|\Delta\phi_0| \leq 180°$); the additional twist $\pm m\pi$ in the second bistable state (where m is an integer); the orientation P of the polarizer relative to the alignment of the liquid crystal on the front face ($-90° \leq P \leq 90°$); the thickness d; and the birefringence $\Delta n$ of the liquid crystal.

These parameters are selected in such a manner as to obtain optimum optical performance for the device, in particular in terms of contrast, brightness, color, etc.

A particular feature of bistable displays is the fact that most of the time only two states are present, and thus optical optimization need apply only to these two bistable states.

It is shown that in general, regardless of the orientation P of the polarizer 10, there are a plurality of solutions that give optimum optical performance. Selecting between these solutions makes it possible, without loss of optical quality, also to optimize the switching of the liquid crystal, e.g. by reducing the thickness d of the layer 40.

Bistable devices require an electric field E to be applied which is strong, close to 10 V/µm. The control voltages $U = d \cdot E$ are thus quite high compared with traditional displays. A reduction in thickness enables U to be reduced by the same factor.

The optical relaxation time after switching, which is proportional to $d^2$, is also favorably shortened with small d, and this is very important for fast applications, e.g. for displaying video.

Finally, bistable nematics are caused to switch under the control of shear flows launched at the end of a control pulse. Having a liquid crystal of small thickness increases the hydrodynamic coupling between the various flows and thus encourages more effective control of the display.

The person skilled in the art will understand the importance of the optimum configuration presented by this invention: it makes it possible simultaneously to improve the optical quality, the speed, the control voltage, and the switching of the device between the bistable states.

In order to understand the importance of the case where $|\delta| \approx 90°$, it is necessary to begin by qualitatively analyzing the optical behavior of the two bistable textures without a compensator. The weakly twisted texture $T_0$ is optically close to a birefringent plate oriented at 45° relative to the polarizer and presenting an optical delay $d \cdot \Delta n \approx \lambda/4$. The combination of a linear polarizer and a $\lambda/4$ plate (i.e. the liquid crystal) then forms a circular polarizer. On reflection, the circularly polarized light reaching the mirror changes the sign of its rotation, and on its second pass it is interrupted by the circular polarizer so that the low twist state appears to be black in reflection. The high twist state ($\Delta\phi \pm m\pi$) is optically nearly isotropic and the light reaching the mirror is almost linearly polarized (or polarized elliptically to a very small extent). After reflection and passing a second time through the liquid crystal, the light leaves without loss in the polarizer, thus achieving a pale state.

When a λ/4 compensator is superposed on the weakly twisted state (with the slow axis of the compensator perpendicular to the slow axis of the liquid crystal), total birefringence becomes zero and this state becomes pale. In contrast, since the birefringence of the highly twisted state is negligible, when the λ/4 compensator is present, the system returns to being a circular polarizer and so the state is black. The λ/4 compensator thus serves to invert the contrast of the device. Its "white" and "black" states are interchanged.

It can be advantageous to invert contrast by means of a compensating plate. Firstly, even with the monostable display, it may be preferable to use normal or inverted contrast depending on the application, whether for technological reasons (ease of manufacture), esthetic reasons, or ergonomic reasons (viewing comfort, etc.).

For the bistable devices constituting the subject matter of the present invention, inverted contrast gives two important additional advantages.

A feature of bistable displays is the fact that while switching between the two states, under the influence of a strong field, an inevitable "parasitic" texture is produced which is almost homeotropic and similar in appearance to the highly twisted state. In normal contrast, the parasitic state is white and is highly disturbing to the state of black pixels, significantly decreasing mean contrast. However with inverted contrast this homeotropic state is black, in which case it does indeed reduce the mean brightness of the device, but only very little.

Another feature of bistable displays is their small thickness (d≈1 μm to 3 μm) and the high twist in one of the states (Δφ±mπ, in which case the helical pitch is 2 μm to 3 μm). Technologically, it is difficult to ensure that the overall or local thickness is accurate to within tolerance of better than ±0.1 μm. Account therefore needs to be taken of the real optical thickness of the liquid crystal departing from the "ideal" value for which the cell has been optimized. Thus, because of the large amount of twist, the azimuth torque applied to the anchoring is high. This can give rise to (global or local) variation in Δφ relative to its optimum value. Variation in d and in Δφ significantly changes the optical properties of the weakly twisted birefringent state. However, the optics of the highly twisted state depends very little on d and Δφ. With inverted contrast, the display presents good contrast and very good uniformity, in spite of departures in d and Δφ.

For a texture that is uniformly twisted, in which the helical pitch is considerably greater than the wavelength of the light, when propagation is parallel to the axis of the helix, there exist well-known analytic formulae [document 6] which describe the optical properties of the system to within a good approximation.

We begin by envisaging the case of a compensator 20 placed between the polarizer 10 and the liquid crystal 30/40/50, oriented at 45° relative to the director on the front face (as shown in FIG. 3).

Taking account of the fact that light passes twice through the device, we obtain the following general formula for reflection of a texture twisted at an angle Δφ.

$$R(\Delta\phi) = [\cos(\varepsilon)\cos(\delta) - \sin(\varepsilon)\sin(\delta)\sin(2P-\alpha)]^2 + \sin^2(\varepsilon)\cos^2(2P-\alpha) \quad (1)$$

where:

$$\sin\left(\frac{\varepsilon}{2}\right) = \frac{\pi\xi}{\sqrt{\Delta\phi^2 + \pi^2\xi^2}} \sin\left(\sqrt{\Delta\phi^2 + \pi^2\xi^2}\right) \quad (2.a)$$

$$\tan\left(\frac{\varepsilon}{2}\right) = \frac{\pi\xi}{\sqrt{\Delta\phi^2 + \pi^2\xi^2}} \tan\left(\sqrt{\Delta\phi^2 + \pi^2\xi^2}\right) \quad (2.b)$$

$$\xi = \frac{d \cdot \Delta n}{\lambda} \quad (2.c)$$

where ε and α are functions of the integrated birefringence of the liquid crystal d·Δn, of the wavelength of the light λ, of the twist angle of the state Δφ, and of the orientation of the polarizer 10.

In monochromatic light at a wavelength $\lambda_0$, it is always possible to select $\delta(\lambda_0)=90°$. Under such circumstances, equation (1) simplifies to $R(\Delta\phi)=\sin^2\varepsilon$. For the texture that is slightly twisted at an angle $\Delta\phi_0$, we seek $R(\Delta\phi)=1$, i.e.

$$\sqrt{\Delta\phi^2 + \pi^2\xi^2} = \sqrt{2}\pi\xi \, \sin(\sqrt{\Delta\phi_0^2 + \pi^2\xi^2}) \quad (3.a)$$

whereas for the highly twisted texture, we require $R(\Delta\phi+m\pi)=0$, i.e.

$$\sqrt{(\Delta\phi_0 \pm m\pi)^2 + \pi^2\xi^2} = k\pi \quad (3.b)$$

where k is an integer, k=0, 1, 2, . . . .

Figure 5:
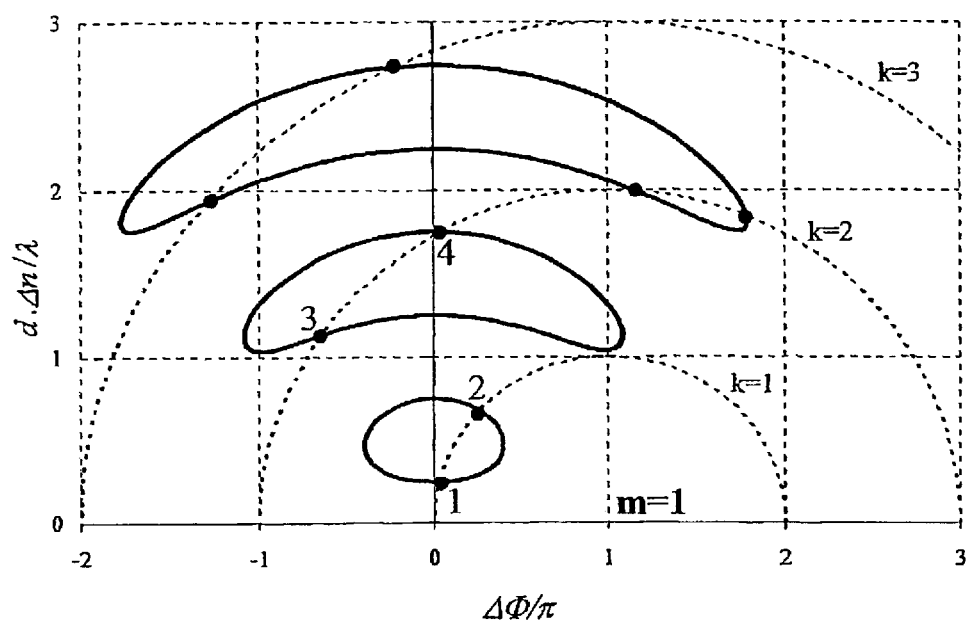
FIGS. 5 and 6 show different solutions of equations involved in optimizing a device in accordance with the present invention, as explained below.
Figure 6:
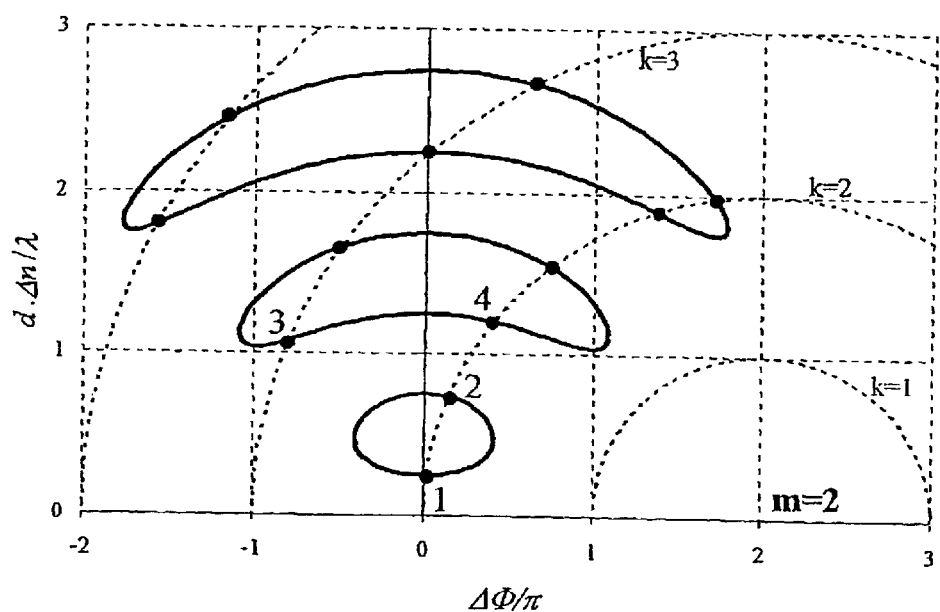

Simulated solutions for equations (3.a) and (3.b) are shown graphically in FIGS. 5 and 6, respectively for m=1 (device bistable by breaking anchoring) and m=2 (device bistable in volume) as the points of intersection between two families of curves. In both cases, there exist an infinite number of solutions ($\Delta\phi_0$, $\xi_0$) which optimize the optics of the device in monochromatic light, ensuring brightness of 100% and infinite contrast. For fixed Δn and $\lambda_0$, these solutions correspond to increasing thicknesses, and on this criterion the optimum solution is the point referenced 1 in FIGS. 5 and 6 which corresponds to ξ≈0.25 and thus to minimum thickness. This thickness is half the value that is optimum for a transmission bistable display (ξ≈0.5). The device of the present invention thus makes it possible to halve the control voltage and to divide the relaxation time in the absence of a field by 4, compared with the transmission device. All of the other solutions correspond to ξ≈0.5 and therefore give rise to devices which are slower and which have control fields that are stronger.

Because of manufacturing tolerances, in a real device values of ξ (and thus of d) and of $\Delta\phi_0$ can depart from their optimum values. It is therefore preferable to select a solution around which the reflectivity of the two states depend little on variations in ξ and in $\Delta\phi_0$.

Figure 7:
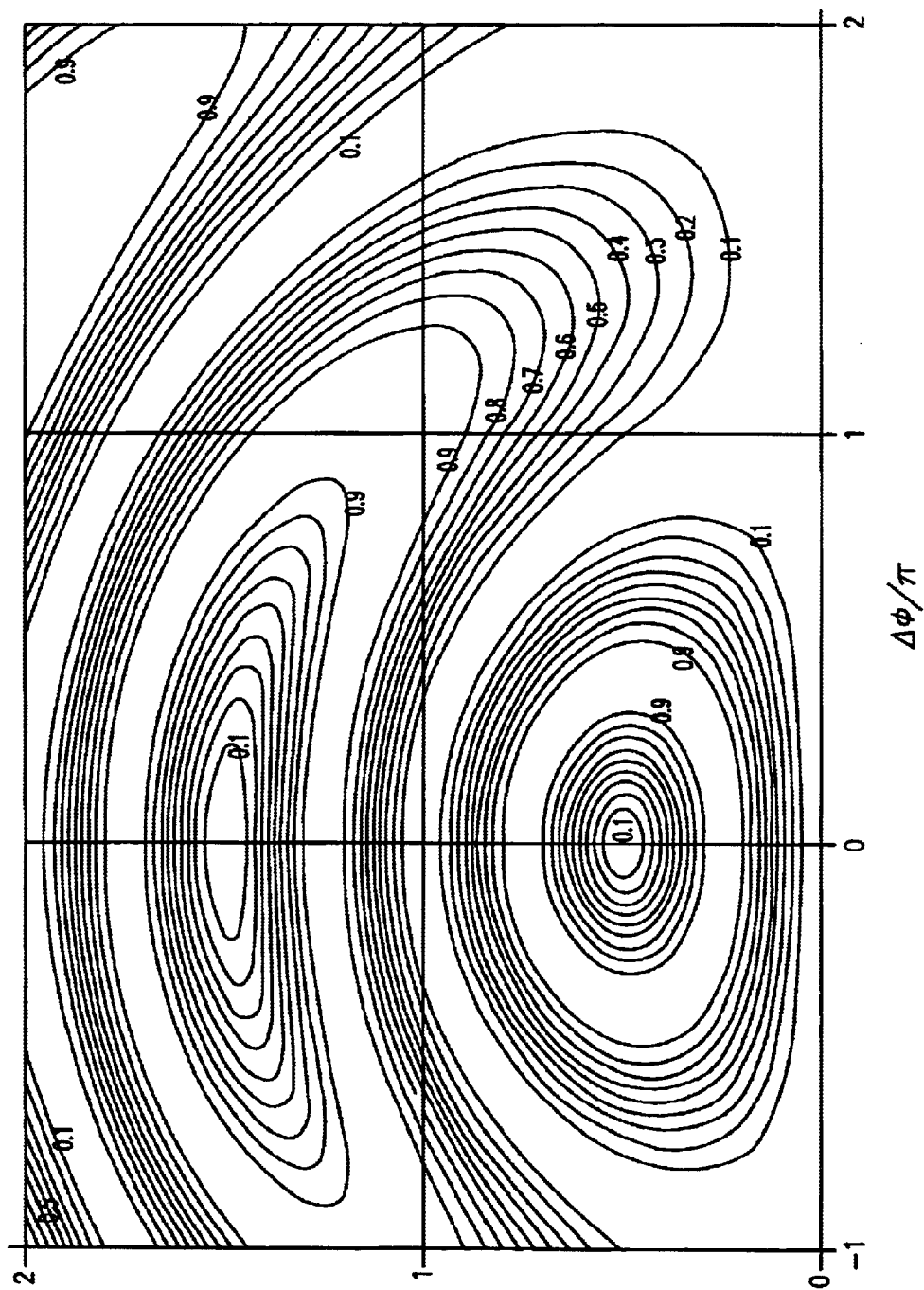
FIGS. 7 and 8 show variations in reflectivity for two bistable textures.
Figure 8:
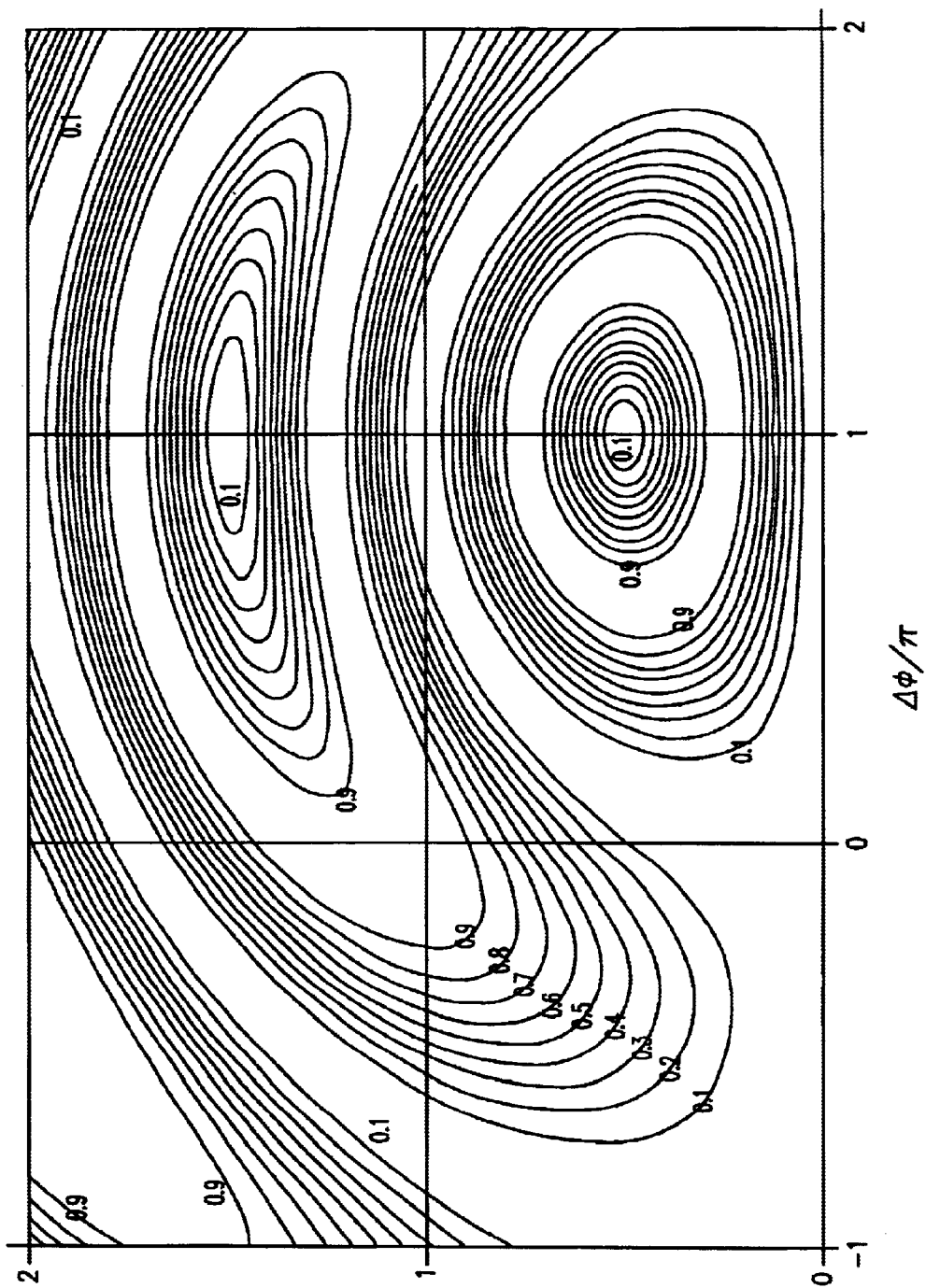

FIGS. 7 and 8 show variations in reflectivity for two bistable textures having twists $\Delta\phi_0$ and $\Delta\phi_0-\pi$ as a function of $\Delta\phi_0$ and of ξ. Variation of the white state around point 1 is comparable to that around the other possible solutions (FIG. 7). Variation in the black state around solution 1 (FIG. 8) is much smaller than it is close to the other solutions; this is the only solution which makes it possible to conserve good contrast even when the tolerances on d and $\Delta\phi_0$ are large. The same conclusion applies to the other possible highly twisted textures $\Delta\phi_0+m\pi$, m=1, 2. It can thus be seen that in monochromatic light, the parameters which optimize the bistable device proposed in the present invention are d·Δn/λ₀≈0.25 and |Δφ₀|≈6°, which are almost the same for additional twists of π and 2π. In addition, in this case, the optical properties of the device do not depend on the orientation P of the polarizer 10 relative to the director of the liquid crystal 40.

In white light, ξ and the phase shift δ of the compensator 20 are functions of λ, and the condition δ(λ)=90° cannot be satisfied for all wavelengths. To calculate the optical response of the device in white light, its optimum parameters ξ₀(λ₀)=d·Δn/λ₀≈0.25 and |Δφ₀|≈6° are selected for a particular wavelength λ₀. To a first approximation, it is assumed that the birefringence Δn of the liquid crystal 40 and of the compensator 20 vary slowly with λ.

Figure 9:
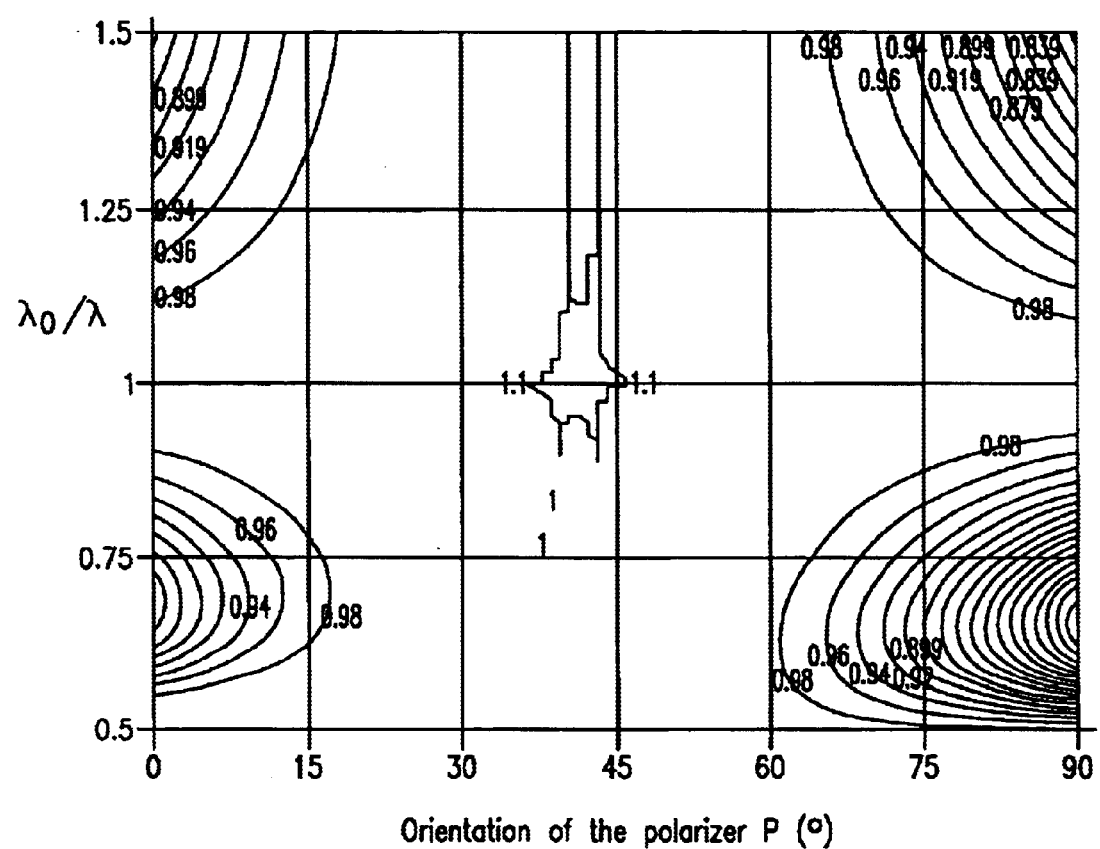
FIGS. 9 and 10 show the reflectivities of two bistable states.
Figure 10:
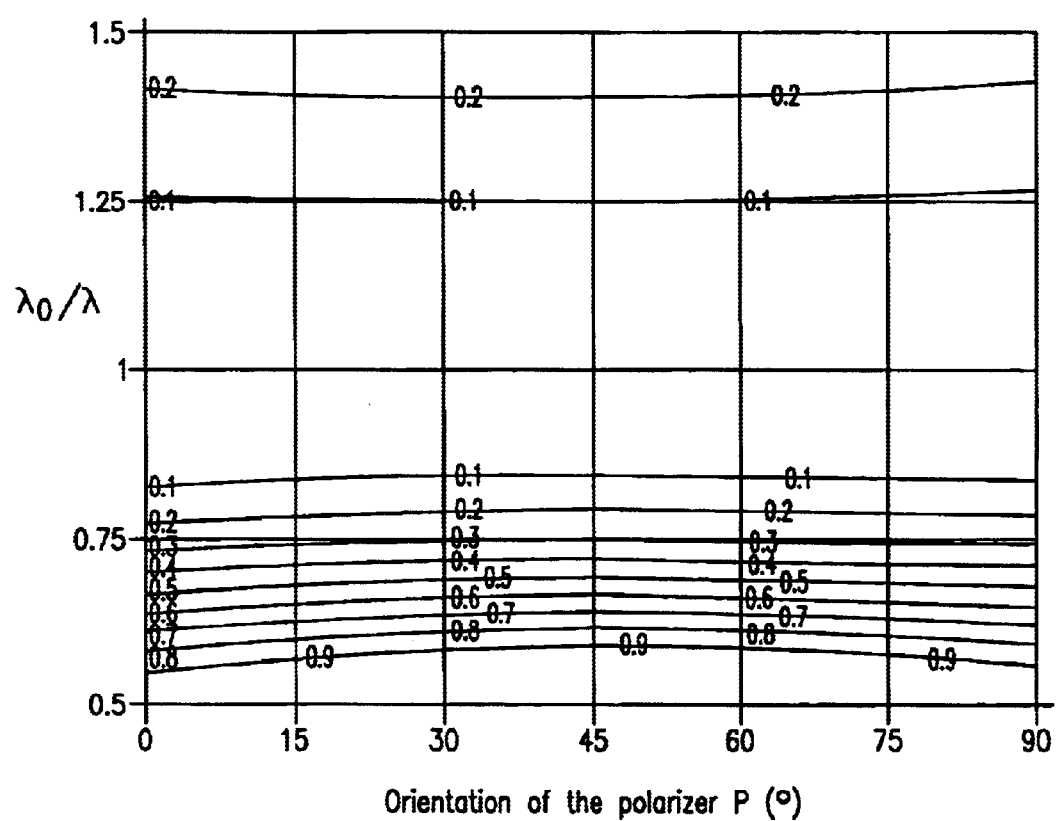

FIGS. 9 and 10 show the reflectivities of the two bistable states calculated using equation (1) as a function of P and of λ/λ₀.

It can be seen that over a very wide range of wavelengths, the pale state (FIG. 9) retains reflectivity R(Δφ₀)≈1. This very favorable property is due to compensation between the dispersions of the compensator 20 and of the liquid crystal 40. It is optimum for point 1 in FIG. 5, proposed in the present invention for optimizing the reflective bistable device. It should be observed that in white light, the brightness of the pale state depends on P. The optimum orientation for the polarizer 10 is achieved over a broad range around P=45° (15°<P<75°). The black state varies to a greater extent (in this state the dispersion of the compensator 20 is not compensated by that of the liquid crystal 40), but reflectivity remains close to zero over a reasonable range of values for λ₀/λ, thus enabling good contrast to be obtained in white light. A judiciously chosen dispersion for the compensator 20 can provide additional improvement in contrast under such circumstances.

An additional reduction in the optimum thickness of the device can be obtained if the phase shift of the compensating plate 20 is varied around 90°.

Figure 11:
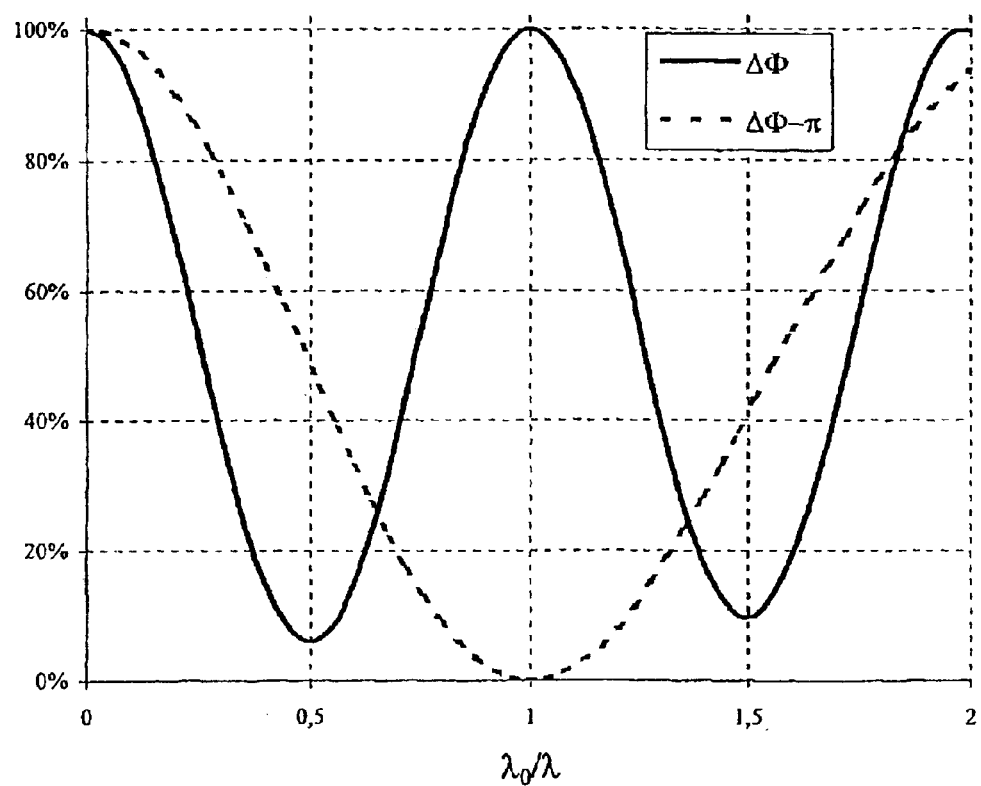
FIG. 11 shows the reflectivities of two bistable states with inverse contrast, calculated as a function of $\lambda_0/\lambda$.

FIG. 11 shows the reflectivities of two bistable states Δφ and Δφ-π in inverted contrast, calculated as a function of λ₀/λ for ξ₀=0.215, P=38°, Δφ=-15°, and δ=-85°. The values were selected to optimize both the contrast and the brightness of the display simultaneously while remaining at a minimum thickness for the liquid crystal layer d=ξ₀/Δn·λ₀. Similar results are obtained with P varying over the range 15° to 75°, with values of Δφ(P) close to those used for the case where δ(λ₀)=90°.

Additional improvements (e.g. a reduction in the reflectivity dispersion of the black state) can be obtained by using a compensator 20 having small variation of Δn_c(λ)/λ around λ=λ₀. Very similar results are obtained for all of the high twist textures envisaged in the present invention, Δφ±mπ where m=1, 2.

Figure 12:
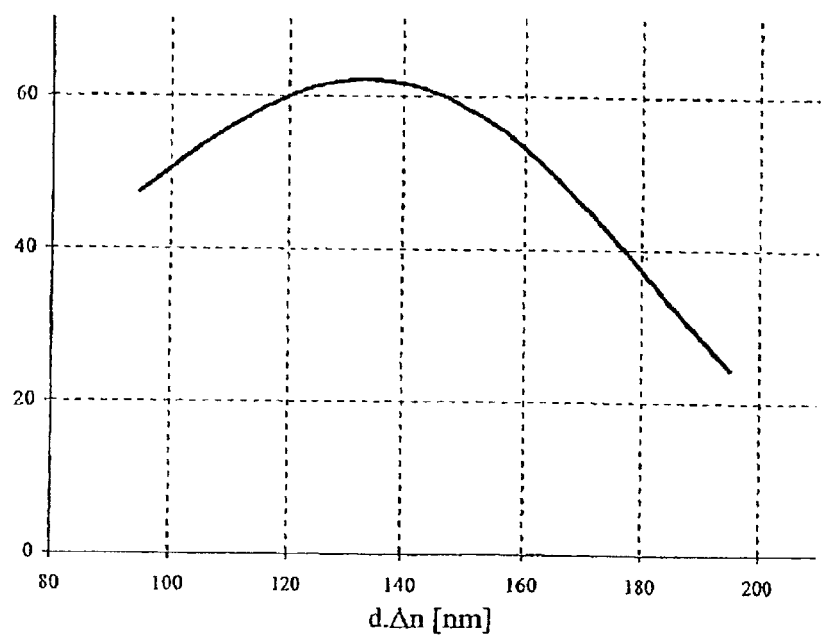
FIG. 12 shows contrast in white light for a standard source calculated for a device with inverted contrast, as a function of optical thickness $d \cdot \Delta n$.

FIG. 12 presents contrast in white light (for a D65 standard light source), calculated for a device using inverted contrast, as a function of the optical thickness d·Δn of interest for numerous applications of the cell.

Figure 13:
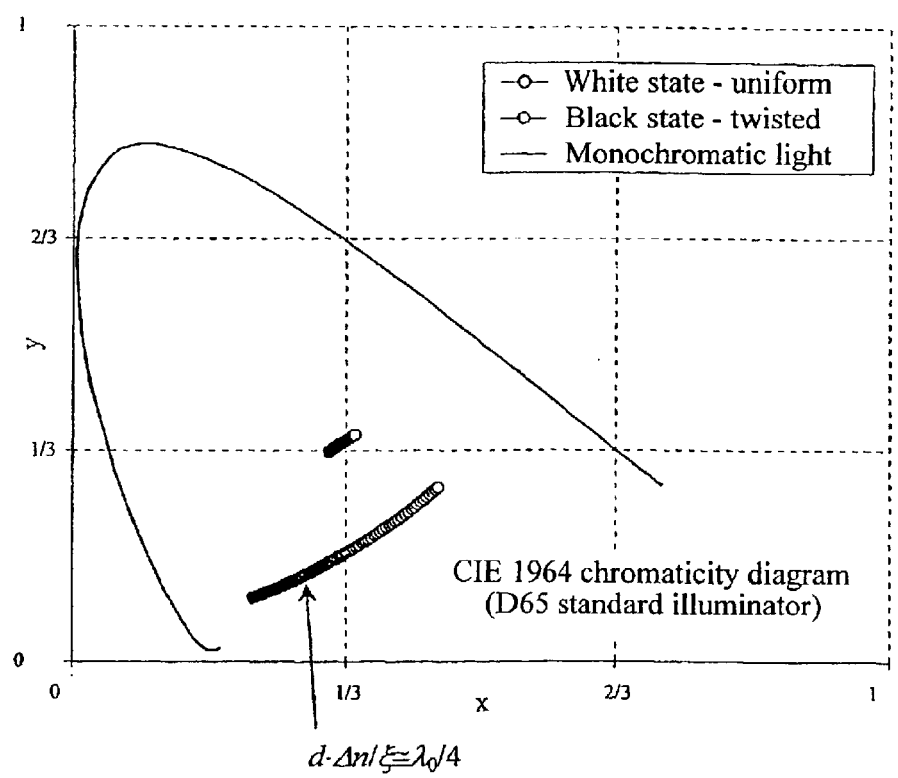
FIG. 13 shows the chromaticity diagram for the device proposed by the present invention as a function of the thickness d of the liquid crystal.

FIG. 13 shows the chromaticity diagram for the device proposed in the present invention, as a function of the thickness d of the liquid crystal. The pale state corresponds to a perfect white color independently of d. The color of the dark state varies with d and can be adjusted by varying this parameter without loss of contrast.

Figure 14:
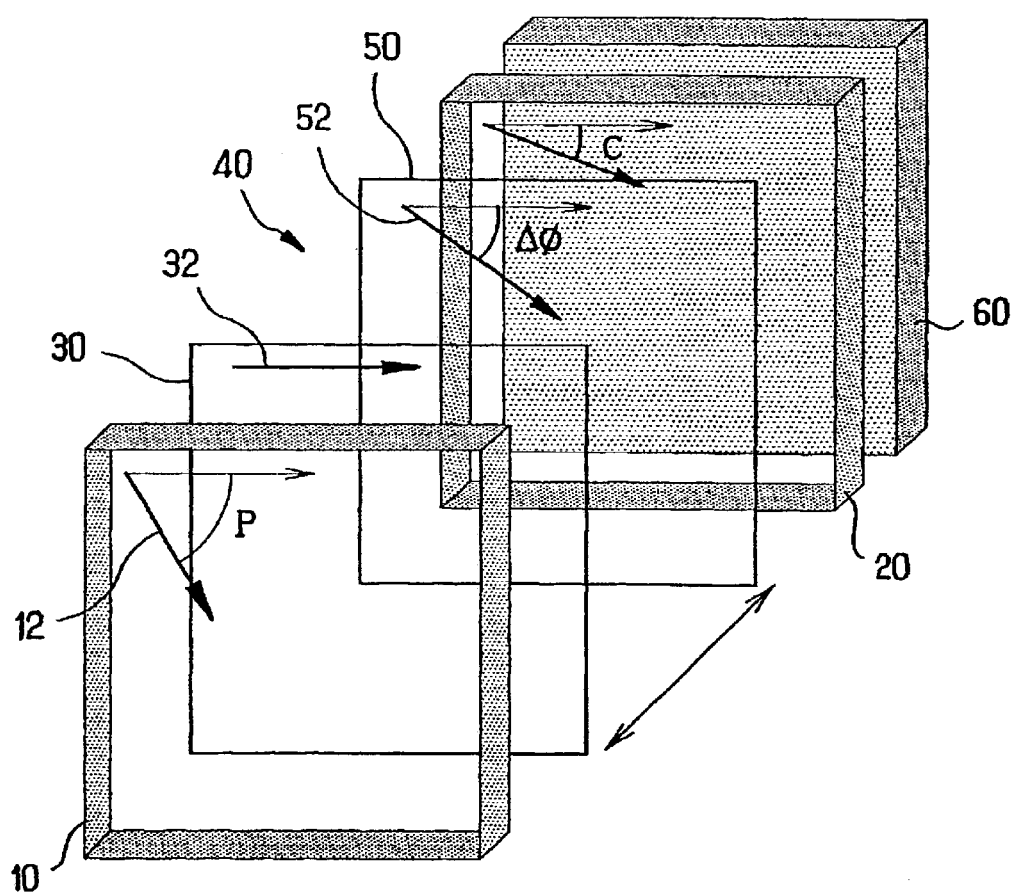
FIG. 14 shows a variant disposition for the compensating plate in accordance with the present invention.

Another possible configuration of the device is shown in FIG. 14. In this case, the compensator 20 is placed between the liquid crystal 30/40/50 and the mirror 60, and is oriented at an angle C relative to the director of the front face.

Figure 1:
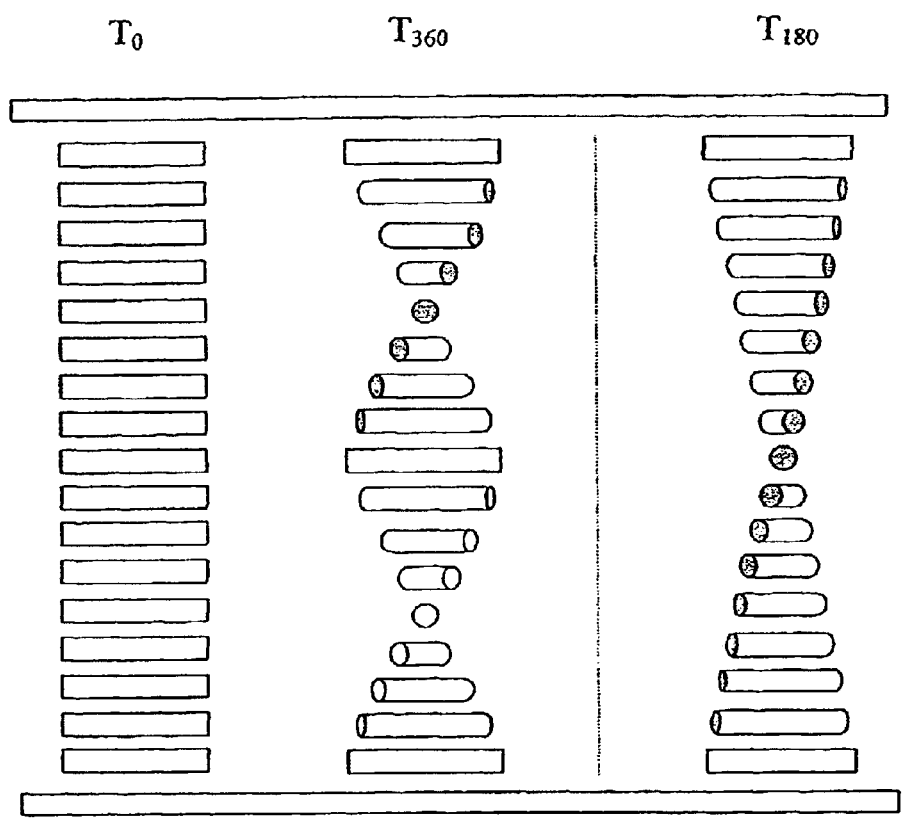
Figure 2:
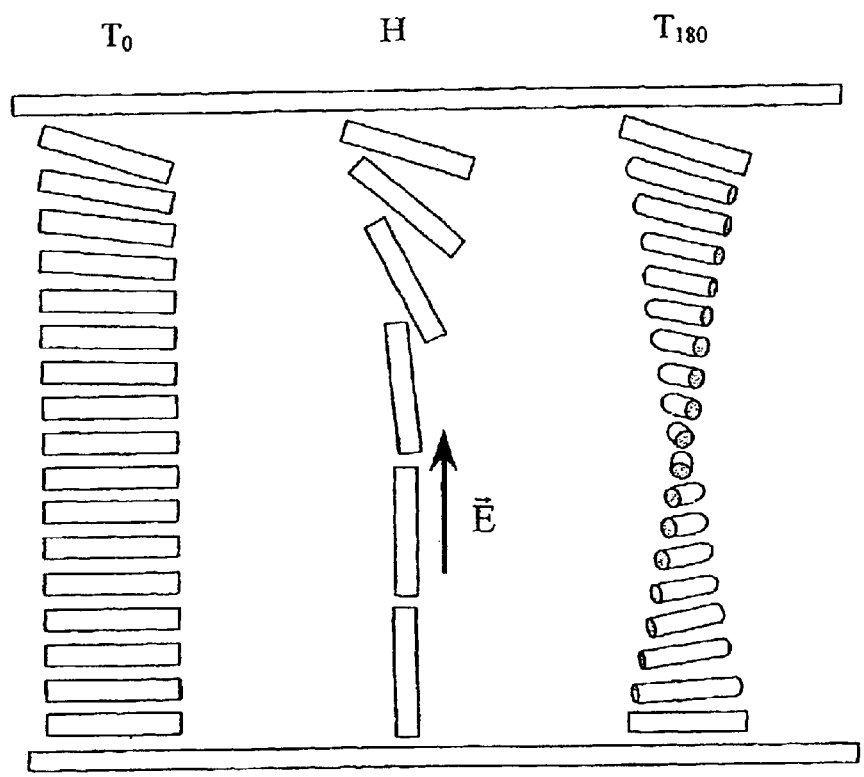

In other words, in FIG. 14, the compensator 20 is placed not in front of the liquid crystal cell as in FIG. 1, but behind said cell.

The reflectivity of this configuration is given by:

$$R(\Delta\phi) = (\cos\delta \cos\varepsilon - \sin\delta \cos\beta_1)^2 + [\cos\delta \sin\varepsilon \cos\beta_0 + \sin\delta(\sin\beta_0 \sin\beta_1 + \cos\varepsilon \cos\beta_0 \cos\beta_1)]^2$$

where $$\begin{cases} \beta_0 = 2P - \alpha \\ \beta_1 = 2C - \Delta\phi + \alpha \end{cases} \quad (4)$$

In monochromatic light, at δ(λ₀)=90°, in order to have reflectivity R(Δφ±mπ)=0 for the highly twisted state, it is necessary to satisfy the equations:

$$\sqrt{(\Delta\phi_{0\pm m\pi})^2 + \pi^2 \xi^2} = k\pi \quad (5)$$

$$C - P = \pm\frac{\pi}{4} + \Delta\phi_0 - \alpha \approx \pm\frac{\pi}{4}$$

with α=α(Δφ₀±mπ).

Simultaneously, in order to ensure reflectivity R(Δφ₀)=1 for the twisted state it is necessary to satisfy:

$$\sqrt{(\Delta\phi_{0\pm m\pi})^2 + \pi^2 \xi^2} = k\pi \quad (6)$$

$$P = \pm\frac{\pi}{4} + \frac{\alpha}{4}$$

with α=α(Δφ₀).

It can be seen that these are the same conditions as in equations (3.a) and (3.b) but that it is also necessary to satisfy two additional conditions concerning the orientations of the polarizer 10 and of the compensator 20 relative to the liquid crystal 40. The optimum solution still corresponds to point 1 in FIGS. 5 and 6, thus ensuring minimum thickness, with very slow variation in optical properties as a function of Δφ₀ and ξ, and with good color. This configuration is thus less advantageous than the configuration of FIG. 4 (compensator 20 in front of the liquid crystal) because it requires optical elements to be precisely oriented, and this is difficult to achieve simultaneously for all wavelengths (the angles α depend on λ). Nevertheless, this solution can be envisaged for the purpose of simplifying manufacture of the device since it makes it possible to place the mirror 60 and the compensator 20 together.

Naturally, the present invention is not limited to the particular embodiments described above, but it extends to all variants within its spirit.

[1] EP-A-0 018 180
[2] FR-A-2 740 894
[3] SAID 99, "Reflective single-polarizer bistable nematic liquid crystal display with optimum twist", by Y. J. Kim, et al.
[4] J. Appl. Phys., Vol. 37 (1998), "Reflective bistable twisted nematic liquid crystal display", by Z. L. Xie, et al.
[5] Journal of Applied Physics "Optimization of reflective bistable twisted nematic liquid crystal displays", by Z. L. Xie, et al.
[6] Appl. Phys. Lett. 51 (18) November 1987 "Optical properties of general twisted nematic liquid crystal displays", by H. L. Ong

What is claimed is:

1. A reflective bistable display device, characterized by the fact that it comprises:

a) a liquid crystal material (40) contained between two parallel substrates (30, 50) having electrodes on their facing inside surfaces to apply an electric field to said liquid crystal, at least the front substrate (30) and the front electrode being optically transparent;

b) alignment layers or treatments on the electrodes to orient the liquid crystal and enable at least two distinct stable or metastable textures to be implemented alternatively in the absence of a field, where one of the textures is either non-twisted, or else twisted at a total angle lying in the range −90° to +90°, and the other possible texture presents additional twist to left or to right through an angle that is essentially an integer multiple of 180°;

c) the thickness d of the liquid crystal layer (40) being selected in such a manner that the product $d \cdot \Delta n$ is close to $\lambda_0/4$, where $\lambda_0$ is the center wavelength of the working spectrum band of the display and $\Delta n$ is the birefringence of the liquid crystal for said wavelength;

d) means designed to apply electrical signals to the liquid crystal enabling it to switch between said two distinct textures and to remain in one or other of them after the field has been removed;

e) a polarizer (10) associated with the front face of the device, placed inside or outside the device;

f) a specular or diffusing reflective element (60) placed at the rear face of the liquid crystal, inside or outside the device, enabling light to pass twice through the device and return towards an observer or towards additional optical elements; and g) a compensator (20) placed between the polarizer and the reflective element, the compensator presenting an optical delay $d_c \cdot \Delta n_c$ that is close to $\lambda_0/4$.

2. A device according to claim 1, characterized by the fact that the liquid crystal material (30) comprises a liquid crystal or a liquid crystal mixture in a nematic phase.

3. A device according to claim 1, characterized by the fact that the liquid crystal material (30) comprises a liquid crystal or a liquid crystal mixture in a cholesteric or nematic phase doped by a chiral substance to enable the energies of certain textures amongst textures that are stable or metastable to be brought close together or equalized.

4. A device according to any one of claims 1 to 3, characterized by the fact that the liquid crystal, the alignment layers, and the means for applying the field are selected to enable switching under a field to be performed by breaking anchoring or by propagating defects between two textures that are bistable or metastable in the absence of a field, with the difference between the total twist angles in said two textures being essentially close to 180°.

5. A device according to any one of claims 1 to 3, characterized by the fact that the liquid crystal, the alignment layers, and the means for applying the field are selected in such a manner as to enable switching under a field to be performed by breaking anchoring, by in-volume continuous distortion, or by propagating faults between two textures that are bistable or metastable in the absence of a field, and the difference in total twist angles with these two textures is essentially close to 360°.

6. A device according to claim 1, characterized by the fact that the compensator (20) is placed between the polarizer (10) and the liquid crystal (40).

7. A device according to claim 1, characterized by the fact that the compensator (20) is placed between the liquid crystal (40) and the reflective element (60).

8. A device according to claim 1, characterized by the fact that the compensator (20) introduces an optical delay $\Delta l$ lying in the range $0.15\lambda_0$ to $0.35\lambda_0$, where $\lambda_0$ is the center wavelength of the working spectrum band.

9. A device according to claim 1, characterized by the fact that the compensator (20) is oriented at an angle lying in the range 35° to 55° relative to the polarizer (10).

10. A device according to claim 1, characterized by the fact that the compensator (20) is oriented at an angle close to 45° relative to the polarizer (10).

11. A device according to claim 1, characterized by the fact that the optical delay $d.\Delta n$ of the liquid crystal layer (40) lies in the range $0.15\lambda_0$ to $0.35\lambda_0$, and preferably in the range $0.20\lambda_0$ to $0.32\lambda_0$, where $\lambda_0$ is the center wavelength of the working spectrum band.

12. A device according to claim 1, characterized by the fact that the polarizer (10) is a linear or an elliptical polarizer.

13. A device according to claim 1, characterized by the fact that at least one of the electrodes contains a plurality of different segments in order to enable a plurality of independent pixels to be implemented on the same substrates and in the same device.

14. A device according to claim 1, characterized by the fact that the independent pixels are provided with independent means for applying the field.

15. A device according to claim 1, characterized by the fact that the independent pixels are organized in a multiplexed passive matrix.

16. A device according to claim 1, characterized by the fact that the independent pixels are organized in a multiplexed active matrix.

17. A device according to claim 1, characterized by the fact that the polarizer (10) is oriented at an angle close to 45° relative to the director of the liquid crystal on the front face of the device.

18. A device according to claim 1, characterized by the fact that the twist angle ($\Delta\phi_0$) of the texture in the low twist state, the additional twist $\pm m\pi$ in the second bistable state (where m is an integer), the orientation (P) of the polarizer (10) relative to the alignment of the liquid crystal (40) on the front face (30), the thickness (d) of the liquid crystal material (40) placed between the two substrates (30, 50), and the birefringence ($\Delta n$) of the liquid crystal are optimized in such a manner as to obtain optimum optical performance, in particular in terms of contrast, brightness, and color.

19. A device according to claim 1, characterized by the fact that the optical axis of the compensator (20) is oriented at substantially 45° relative to the polarizer (10).

20. A device according to claim 1, characterized by the fact that the compensating plate (20) introduces an optical delay lying in the range 100 nm to 180 nm.

21. A device according to claim 1, characterized by the fact that the polarizer (10) is combined with the compensator (20) in the form of a single element to constitute an electrical polarizer.

22. A device according to claim 1, characterized by the fact that the thickness of the liquid crystal material (40) is less than 6 $\mu$m.

* * * * *